United States Patent
Ziv et al.

(10) Patent No.: US 12,380,096 B1
(45) Date of Patent: Aug. 5, 2025

(54) NATURAL LANGUAGE API FOR SECURITY GRAPH EXPLORATION

(71) Applicant: MICROSOFT TECHNOLOGY LICENSING, LLC, Redmond, WA (US)

(72) Inventors: Lior Ziv, Tel Aviv (IL); Tamer Salman, Haifa (IL); Idan Hen, Herzliya (IL); Amit Dvir Adani, Herzliya (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/603,825

(22) Filed: Mar. 13, 2024

(51) Int. Cl.
*G06F 16/242* (2019.01)
*G06F 16/23* (2019.01)

(52) U.S. Cl.
CPC ........ *G06F 16/243* (2019.01); *G06F 16/2365* (2019.01)

(58) Field of Classification Search
CPC ............ G06F 16/243; G06F 16/2365
See application file for complete search history.

(56) References Cited

U.S. PATENT DOCUMENTS

| | | | |
|---|---|---|---|
| 12,058,160 B1 * | 8/2024 | Erlingsson | G06F 16/9537 |
| 12,126,643 B1 * | 10/2024 | Skarphedinsson | G06F 21/552 |
| 2013/0185336 A1 * | 7/2013 | Singh | G06F 16/3344 |
| | | | 707/E17.127 |
| 2023/0289698 A1 * | 9/2023 | Bly | G06Q 10/06393 |
| 2024/0045990 A1 * | 2/2024 | Boyer | G06F 40/279 |
| 2024/0370479 A1 * | 11/2024 | Hudetz | G06F 16/316 |

* cited by examiner

*Primary Examiner* — Dangelino N Gortayo
(74) *Attorney, Agent, or Firm* — David Foster; Newport IP, LLC

(57) ABSTRACT

Disclosed are techniques for identifying security vulnerabilities in cloud computing resources. To investigate the configuration of cloud resources, a cloud map query is constructed based on a natural language sentence. In some configurations, a machine learning (ML) model converts the sentence to a structured sentence that conveys the intention of the natural language sentence but in machine readable form. The structured sentence is validated to ensure it represents a legal arrangement of cloud resources. The validated structured sentence is then used to generate a cloud map query. The cloud map query retrieves information about a client's cloud resources. In some configurations, query results are analyzed to identify security vulnerabilities and/or follow-up queries are suggested.

20 Claims, 8 Drawing Sheets

NATURAL LANGUAGE API FOR SECURITY GRAPH EXPLORATION

BACKGROUND

Cloud computing has emerged as a fundamental pillar in software development, driving innovation and scalability across industries. However, growing usage and an expanding feature set has increased exposure to cyber-attack. For example, an unpatched cloud-hosted virtual machine may be compromised by cyber attackers. These attacks can have severe repercussions, including data breaches, data loss, the hijacking of cloud resources to execute denial-of-service attacks, etc.

It is with respect to these and other considerations that the disclosure made herein is presented.

SUMMARY

Disclosed are techniques for identifying security vulnerabilities in cloud computing resources. To investigate the configuration of cloud resources, a cloud map query is constructed based on a natural language sentence. In some configurations, a machine learning (ML) model converts the sentence to a structured sentence that conveys the intention of the natural language sentence but in machine readable form. The structured sentence is validated to ensure it represents a legal arrangement of cloud resources. The validated structured sentence is then used to generate a cloud map query. The cloud map query retrieves information about a client's cloud resources. In some configurations, query results are analyzed to identify security vulnerabilities and/or follow-up queries are suggested.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

One existing technique for identifying cloud security vulnerabilities is to manually query a cloud map—a database representation of cloud resources. A cloud map contains nodes that represent resources and edges that represent connections between those resources. Data contained in the cloud map may be obtained by using a cloud service provider API to enumerate cloud resources and their relationships to one another.

For example, the cloud map may include nodes for virtual machines and nodes for networks. An "is connected" edge between a virtual machine node and a network node indicates that the virtual machine receives traffic from the network or that the network node routes traffic to the virtual machine. Similarly, the cloud map may include nodes for users. A "has permission" edge between a user and a virtual machine indicates that the user has permission to access the virtual machine.

Cloud map queries identify resources based on properties of the resources themselves and how resources are connected to each other. For example, a user may construct a query that identifies users that have permissions on a virtual machine. This query is satisfied by any user node that is connected to a virtual machine node with a "has permission" edge. In order to narrow the results the query may also filter based on node or edge properties, such as the name of the user or the level of permission that the user has.

However, users are often overwhelmed with the complexity of the cloud map. For example, users often do not know what to look for when constructing a query. Even if they do know what to look for, query construction still requires specific knowledge about how cloud computing resources are represented in the cloud map. Furthermore, even if the user does have a working knowledge of the cloud map it still may be difficult to construct a query that provides meaningful information. For example, a security analyst may understand the schema of the cloud map but be unable to leverage that knowledge to construct a query that provides insight into cloud security.

Another barrier to effectively constructing cloud resource queries is understanding the results. For example, the volume of query results may be so large that meaningful results are obscured, or the technical nature of the results can make it difficult to understand their true impact. Users are also frequently unable to understand, prioritize, or construct follow-up queries.

Figure 1:
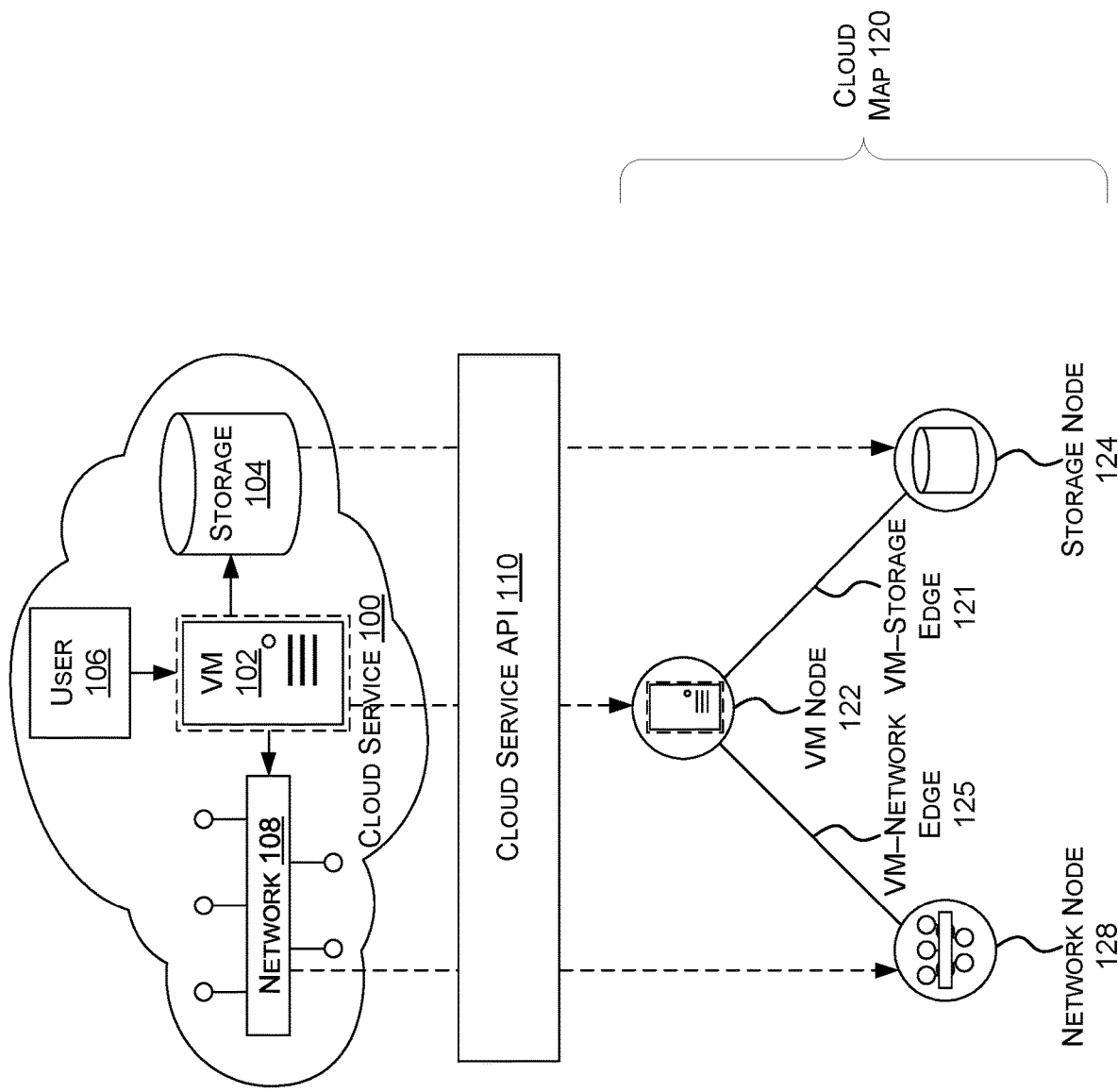
FIG. 1 illustrates a cloud map that represents a configuration of cloud resources.

FIG. 1 illustrates a cloud map that represents a configuration of cloud resources. Cloud service 100 provides easy, scalable access to applications, resources, and services. Cloud service 100 is often fully managed by a cloud service provider, and can be accessed programmatically by cloud service API 110. Examples of cloud services include MICROSOFT AZURE, AMAZON WEB SERVICES (AWS), and the like.

As illustrated, cloud service 100 includes virtual machine (VM) 102, storage 104, user 106, and network 108. Other types of cloud resources are similarly contemplated. Virtual machine 102 may execute a guest operating system on a hypervisor, providing compute as a service. Storage 104 may represent block storage, such as is traditionally found on a hard drive or flash driver. Storage 104 may also represent structured storage, such as a structured query language (SQL) database or other table-based storage.

User 106 refers to a user account assigned to an individual, corporation, or other entity. Cloud service 100 typically limits access to cloud resources to specific users. For example, user 106 may be authorized to access virtual machine 102, but not a different virtual machine.

Network 108 is a cloud resource that allows other cloud resources to communicate with one another or to the outside world. For example, network 108 may be a private internal network that allows two virtual machines to communicate with each other. Network 108 may also expose virtual machine 102 to the public internet.

Cloud resources are typically partitioned so that each client of cloud service 100 only has access to their resources. An administrator may configure the client's cloud resources-provisioning resources, configuring resources, connecting resources, etc. For example, users are created, and potentially grouped, and granted access to resources. Virtual machines are provisioned and connected to storage and network services, among others. Operating systems and/or containers are installed on the provisioned virtual machines, configuring the virtual machine to run the user's application.

Cloud map 120 is a graph of nodes and edges that represents a configuration of cloud resources hosted by cloud service 100. In some configurations, nodes of cloud map 120 represent resources of cloud service 100. As illustrated, VM node 122 represents VM 102, storage node 124 represents storage 104, and network node 128 represents network 108. Edges between nodes of cloud map 120 represent connections or other associations between cloud resources, such as VM-network edge 125, which represents a connection between VM 102 and network 108. Similarly, VM-storage edge 121 represents a connection between VM 102 and storage 104.

Some nodes may be connected by more than one edge. For example, one edge between a user node and a virtual machine node indicates that the user has permissions to the virtual machine. Another edge between the same two nodes may indicate that the user is the resource owner of the virtual machine. These edges may clarify a scenario in which multiple users have permission to the virtual machine but only one user is the resource owner of that virtual machine.

In some configurations, cloud service API 110 may be invoked to enumerate cloud resources that have been provisioned by a particular client. Cloud service API 110 may also enumerate the connections that have been made between these resources.

Figure 2A:
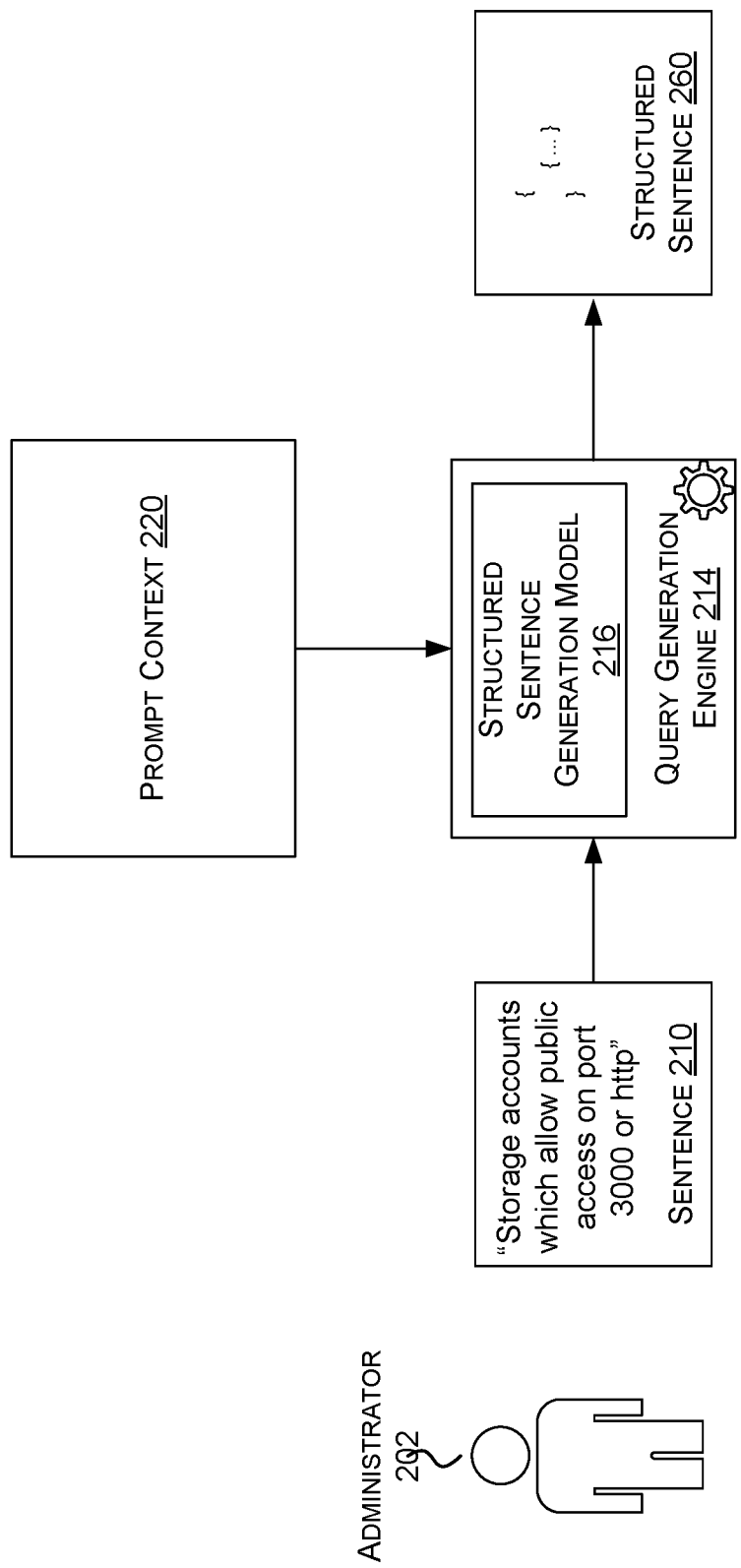
FIG. 2A illustrates generating a structured sentence from a natural language sentence.

FIG. 2A illustrates generating a structured sentence from a natural language sentence. Administrator 202 is tasked with ensuring that effective security is implemented on a client's partition of cloud service 100. In some configurations, administrator 202 may provide sentence 210 to query generation engine 214. Sentence 210 may be a query, such as "Show all storage accounts which allow public access on port 3000 or http". Sentence 210 may also be a request or a command, such as "remove network access for virtual machines that are unpatched".

Query generation engine 214 may utilize structured sentence generation model 216 to generate structured sentence 260. Structured sentence generation model 216 be a large language model, a foundation model, or the like. Structured sentence 260 is a machine readable sentence that reflects the content of sentence 210. Structured sentence 260 may be expressed in a markup language such as extensible Markup Language (XML) or JavaScript Object Notation (JSON).

Structured sentence generation model 216 may be provided with sentence 210 in conjunction with prompt context 220. Prompt context 220 is text that instructs structured sentence generation model 216 to create structured sentence 260. For example, prompt context 220 may include the text "output a single JSON format answer". Prompt context 220 may also include a schema that lists entities of cloud service 100 that may be used to construct structured sentence 260. Details of prompt context 220 are discussed below in conjunction with FIG. 2B.

Figure 2B:
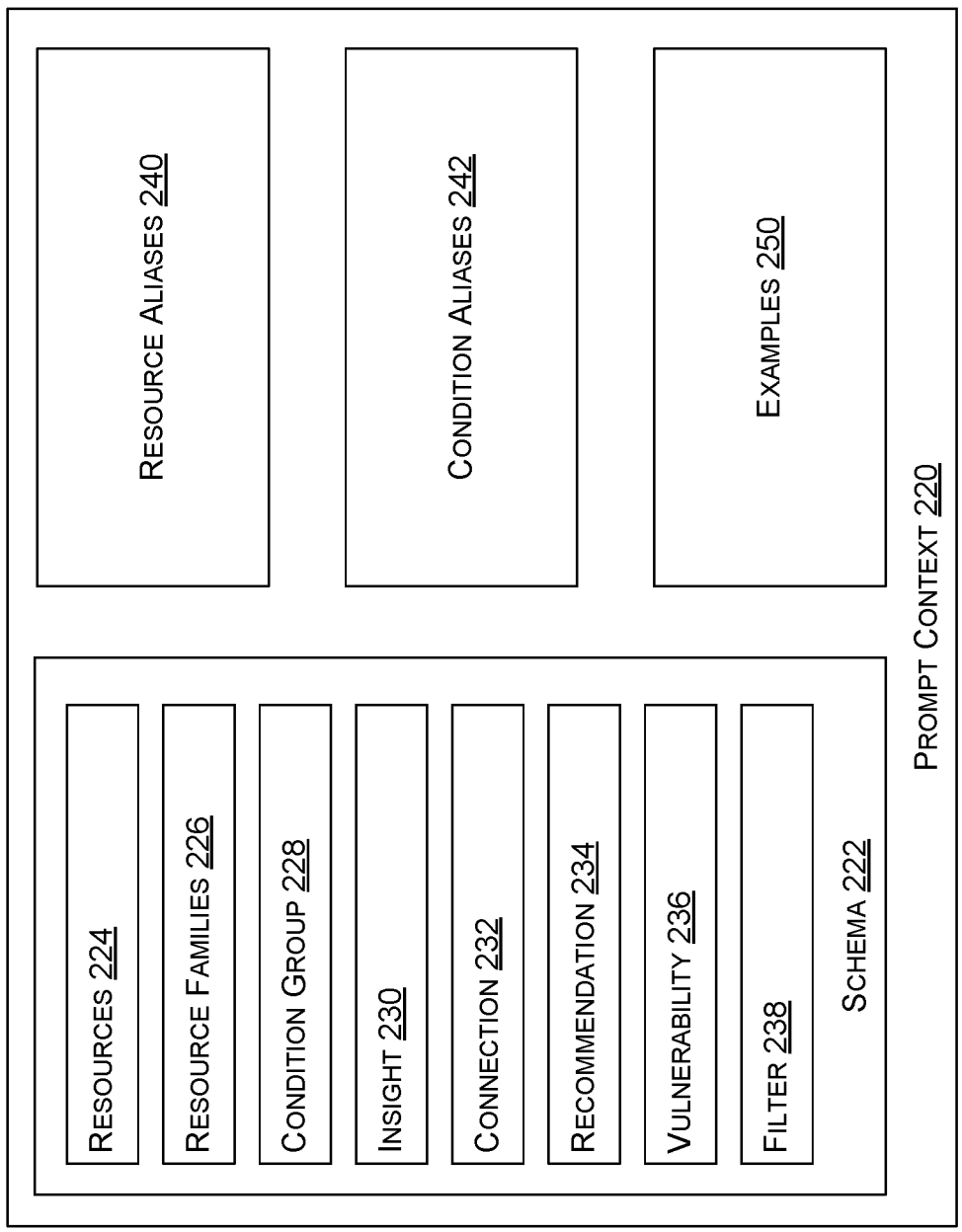
FIG. 2B illustrates a prompt context used by an ML model to generate the structured sentence.

FIG. 2B illustrates a prompt context used by an ML model to generate the structured sentence. Prompt context 220 may include schema 222 which defines the types of entities that may be used on cloud service 100. Schema 222 lists entities used by various clients. Each client uses at least some but not necessarily all of the entities listed in schema 222—clients may or may not employ any particular entity. Listing all possible entities in schema 222 allows for all clients to use the same schema. This avoids a per-client schema, which would be too large to be practical. In some configurations, schema 222 uses generic descriptions of entities, avoiding use of client-specific identifiers. This further reduces the prompt size and also avoids public disclosure of sensitive client-specific information.

Listing all possible entities for all clients also enables structured sentence generation model 216 to make suggestions of configurations that a particular client is not currently using. Including entities that are not employed by a particular client in schema 222 is also valuable because it enables queries on behalf of that client to have null results. For example, a query for exposed strategic resources on a particular HTTP port is still valid even if, for a particular client, the query does not return any results. Enabling queries that do not return any results allows an administrator to verify that a particular configuration is not employed by that client.

Resources 224 and resource families 226 represent specific cloud resources and generic cloud resource types, respectively. Resources 224 may include services provided by specific cloud service providers such as AWS or AZURE. Example AWS services include "ec2", "s3", "lambda", "dynamodb", etc. Example AZURE services include "7icrosoft.documentdb/databaseacccounts", "7icrosoft.sql/servers", etc.

Resources 224 may also include compute resources such as virtual machines, scale sets, and snapshots, networking resources such as virtual networks, subnets, network interfaces, load balancers, and internet gateways, storage such as S3 buckets and AZURE blob containers, database services, and NoSQL storage, Kubernetes resources such as pods, services, statefulsets, and daemonsets, user and access management entities such as users, groups, AWS IAM (Identity and Access Management) users, service principals, and managed identities, application development services such as application hosting services and serverless function invocation, as well as database and analytic services, networking and content delivery services, security compliance services, etc. Resource families 226 include types of resources, independent of a particular implementation. For example, AWS EC2 instances, AZURE virtual machines, and GOOGLE cloud compute instances are examples of resources 224 because they refer to specific cloud resources. A single resource family 226, "Virtual machines", may serve as a name for all three individual resources. Resource families 226 enable queries to return cloud-agnostic results, such as a query for "all internet exposed storage resources".

Condition group 228 defines how conditions may be combined in structured sentence query 260. Condition group 228 may include Boolean operators such as "and" and "or" for logically combining individual conditions. Conditions group 228 also defines a group of conditions as some combination of insight 230, connection 232, recommendation 234, or filter 236.

Insight 230 defines one or more insights that may be inferred from a query result. Non-limiting examples include: "allows public access", "can execute code on the host", "contains common usernames", "contains sensitive data", "doesn't have MFA enabled", "exposed to the internet", "has high severity vulnerabilities", "has tags", "installed software", "is external user", "privileged container", "uses host network", and "vulnerable to remote code execution". These insights may be provided when suggesting an alternative sentence, discussed below in conjunction with FIG. 3. Insights 230 may also be used as part of a condition, as discussed above.

Connection 232 defines how resources may be connected to each other, use each other, have access to each other, etc. Connections are represented as edges in cloud map 120. Examples of connections include "routes traffic to", "gets traffic from", "member of", "contains", "maintains", "being maintained by", "is running", "being ran by", "has permissions to", "can be accessed by", "contains", "member of", "can authenticate as", and "can be authenticated from".

Recommendation 234 indicates the structured sentence generation model 216 may generate a recommendation in response to sentence 210. In some configurations, a recommendation generated by model 216 may include a filter condition, discussed below.

Vulnerability 236 defines potential vulnerabilities that are encountered in cloud map 120. In some configurations, vulnerabilities 236 are a subset of insights 230.

Filter 238 defines predicates used to apply conditions in structured sentence 260. Filters may be applied to a property of an individual cloud resource. Example properties include "name", "id", "port", "tagkey", "tagvalue", "Hosted databases (IaaS)", "Devices", "softwarename", "softwarevendor", "softwareversion", "severity", "status", "description", "cve_id", "cvss_score", and "cvss_vector". Filter 238 may also define operators that may be used when evaluation the filter, such as "equals", "contains", "startswith", and "endswith", etc. Filter 238 may also define Boolean operators usable to combine individual filters, such as "and" and "or", etc.

In some configurations, prompt context 220 also includes aliases-common phrases that are encountered in natural language sentences 210. Aliases included in prompt context 220 are associated with a structure that the alias refers to. Structured sentence generation model 216 may use these aliases when translating sentence 210 to structured sentence 260, e.g., to avoid ambiguity and to account for terms of art not well understood by model 216.

Resource aliases 240 refer to common terms for cloud resources found in natural language sentences 210. Each resource alias 240 is associated with a representation of the resource that can be used when generating structured sentence 260. For example, "vm" may be an alias for the "Virtual machines" resource. Condition aliases 242 similarly refer to common conditions that are encountered in natural language sentences 210, such as "exposed to the internet" of "that has high severity or medium sev vulnerabilities". Each of these condition aliases 242 may be associated with at least one corresponding Condition group 228, filter 238, or other part of schema 222.

Prompt context 220 may also include examples 250 of natural language sentence inputs and corresponding structured sentence outputs. Examples such as these help clarify for structured sentence generation model 216 what to include and how to format structured sentence 260. For example, the sentence "resources owned by X" may be associated with a "has tags" insight 230. A "has tags" insight means that "resources owned by X" is looking for a resource with a particular tag ("X").

Structured sentence 260 may have nested entities. Continuing the example, the insight itself may have a filter condition that looks for a property "owner" that has the value substituted for "X". In some configurations, resource properties are stored in cloud map 120 as key/value pairs, and the "has tags" insight looks for resources with the key "owner" and the value "X".

Figure 2C:
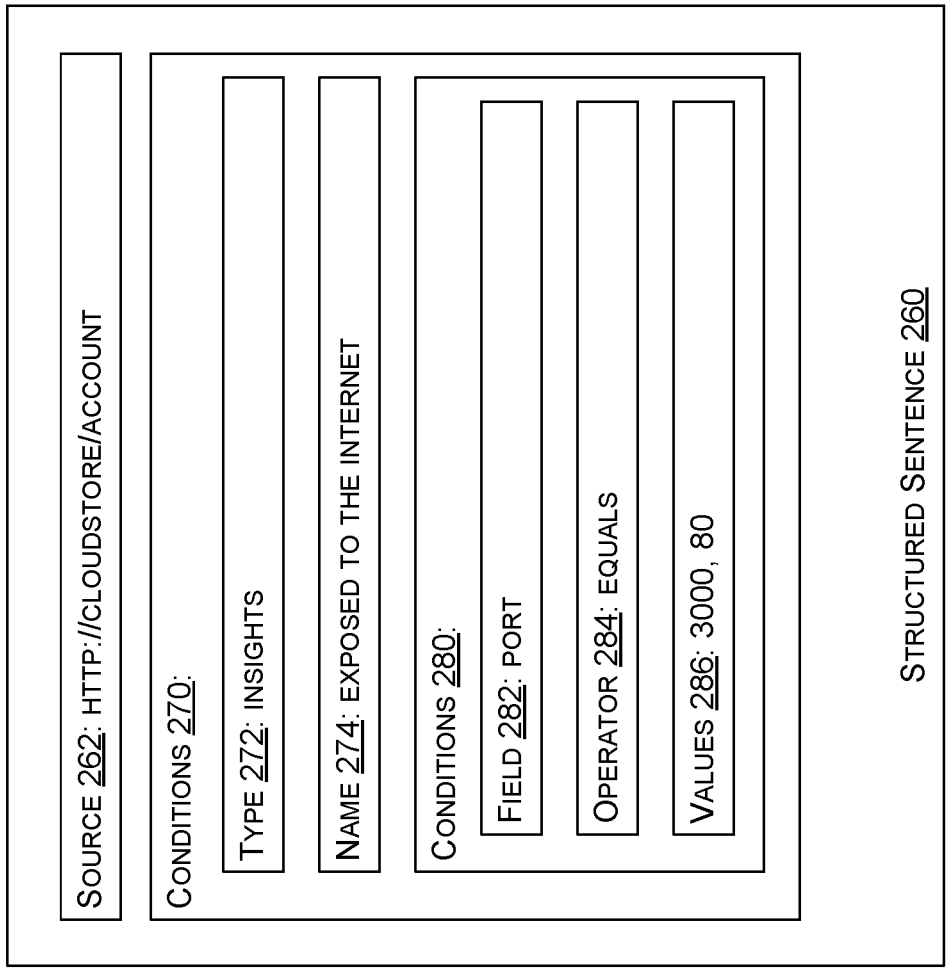
FIG. 2C illustrates an example of a structured sentence.

FIG. 2C illustrates an example of a structured sentence. Structured sentence 260 may have nested properties, which are commonly defined with nested XML or nested JSON. Structured sentence 260 applies to a source 262, which in this example is a storage account. As illustrated, source 262 is a URL endpoint used to identify which storage account is being referred to.

Conditions 270 are also nested within structured sentence 260. Conditions 270 has three nested properties—types 272, name 274, and conditions 280. Types 272 indicates the type of condition 270—insights in this example. Name 274 identifies the specific insight.

Conditions 280 applies a sub condition—a condition on field 282, "port". A "field" condition is an example of a condition that applies to a single resource. Operator 284, "equals", indicates that this condition tests whether the value of the "port" field is equal to one of values 286—3000 or 80.

Figure 3:
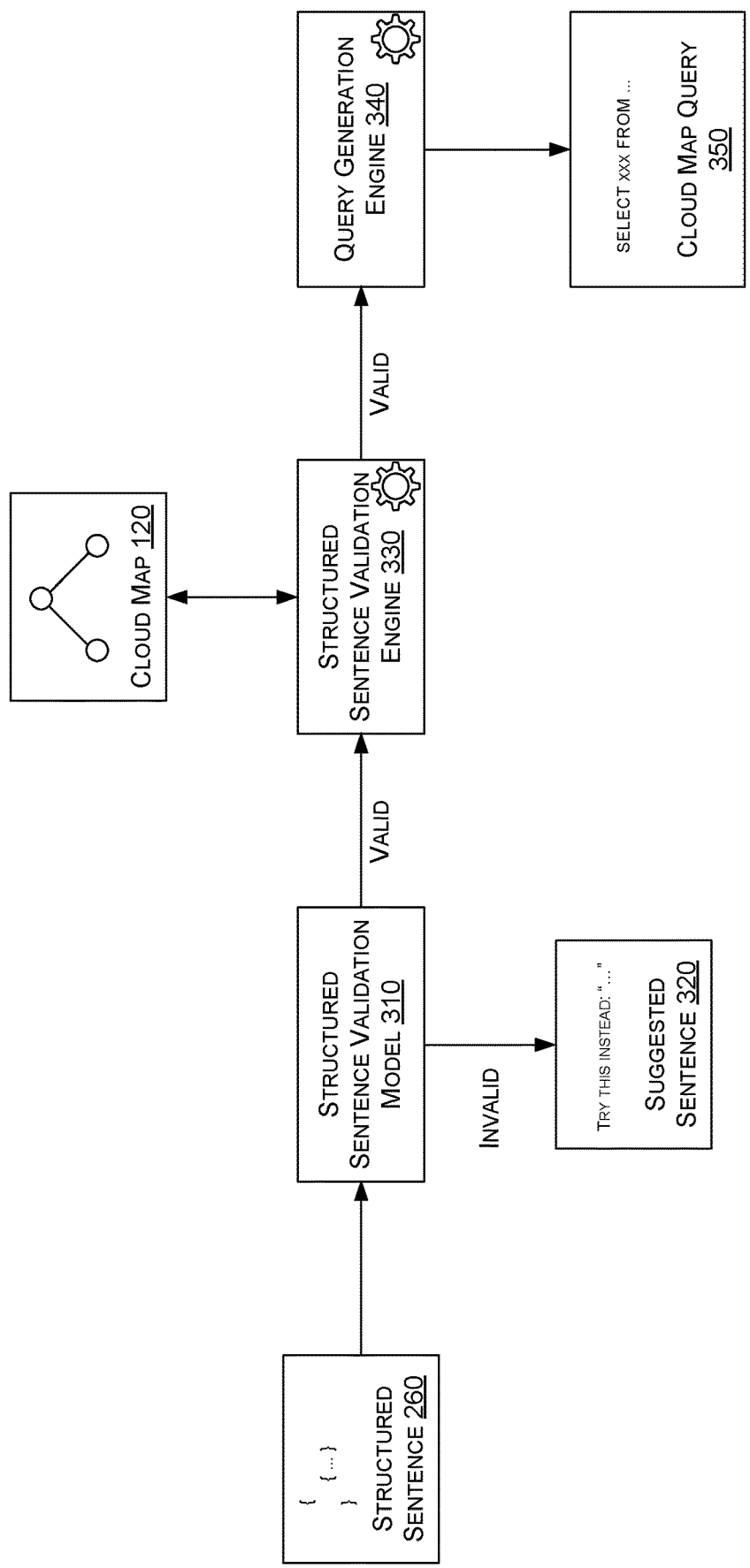
FIG. 3 illustrates generating a cloud map query from the structured sentence.

FIG. 3 illustrates generating a cloud map query from the structured sentence. Structured sentence 260 may be validated before being used to generate cloud map query 350. Structured sentence 260 is validated to ensure fidelity with the configuration of cloud service 100 within cloud map 120.

Prompt context 220 does not encode which relationships between which cloud resources are legal. Instead, prompt context 220, in some configurations, merely lists which resources are available. As such, it is possible that structured sentence model 216 will generate a structured sentence 260 that includes incoherent connections, non-existent properties, or other malformation. For example, virtual machines, users, and multi-factor authentication are all cloud resources. However, while it makes sense for a user to have multi-factor authentication, it is incoherent for a virtual machine to have multi-factor authentication.

As another example, prompt context 220 may include the insight "is exposed to the internet". Sentence 210 may ask "which users are exposed to the internet". While the resource "user" and the insight "is exposed to the internet" both exist in prompt context 220, it is nonsensical to ask which users are exposed to the internet.

In both of these cases, whether due to an ill-conceived sentence 210 or a hallucination of structured sentence generation model 216, structured sentence 260 may contain resources with invalid properties, illegal connections between cloud resources, or other errors. As discussed briefly above, illegally structured sentences are possible in part because prompt context 220 does not define which resources have which properties or which resources may be legally connected. This level of detail would be prohibitively verbose for a large language mode's prompt context.

Instead, structured sentence generation model 216 attempts to construct structured sentence 260 in a legal way without this detailed structure information. Instead, post-hoc validation ensures that structured sentence 260 is legal—i.e., leads to a cloud map query 350 with parameters that match the configuration of cloud map 120.

Multiple methods of validation are contemplated. Structured sentence validation model 310 is a machine learning model that is asked to grade whether structured sentence 260 maps legally to cloud map 120. If structured sentence 260 is invalid, then structured sentence validation model 310 and/or structured sentence generation model 216 may be used to generate suggested sentence 320. Suggested sentence 320 is another sentence that attempts to correct the problem found in structured sentence 260.

For example, blog storage resources are grouped together and managed by containers, similar to how files are grouped tougher and managed by folders on a computer desktop. However, this leads to confusion as the container resource determines whether a particular blob is exposed to the internet or not. Administrators will often mistakenly query for all blobs that are exposed to the internet without specifying which container the blobs are in. Structured sentence validation model 310 may notice this discrepancy and provide suggested sentence 320 to ask if any blob in any container is exposed to the internet. Structured sentence validation model 310 may consider previous interactions with the administrator to provide a more context aware suggestion.

If structured sentence validation model 310 indicates that structured sentence 260 is valid, then optionally a second validation technique may be applied. Structured sentence validation engine 330 may verify directly whether the structure of resources of structured sentence 260, and their connections and properties, map to a corresponding node structure in cloud map 120.

For example, structured sentence validation engine 330 may determine whether edges expressed by structured sentence 260 are valid and exist in the specified direction between the given resources in cloud map 120. Validation engine 330 may also determine whether insights are valid and exist on the given resources. Additionally, or alternatively, validation engine 330 may determine whether a particular filter referenced by structured sentence 260, such as resource filters, insight filters, or edge filters exist for the resource/insight/edge in question.

If structured sentence validation engine 330 determines that structured sentence 260 is valid then query generation engine 340 converts structured sentence 260 into cloud map query 350. In some configurations, sentence validation engine 330 enriches structured sentence 260 by filling in implicit details, such as insights, edge GUIDs, edge directions, etc.

Figure 4:
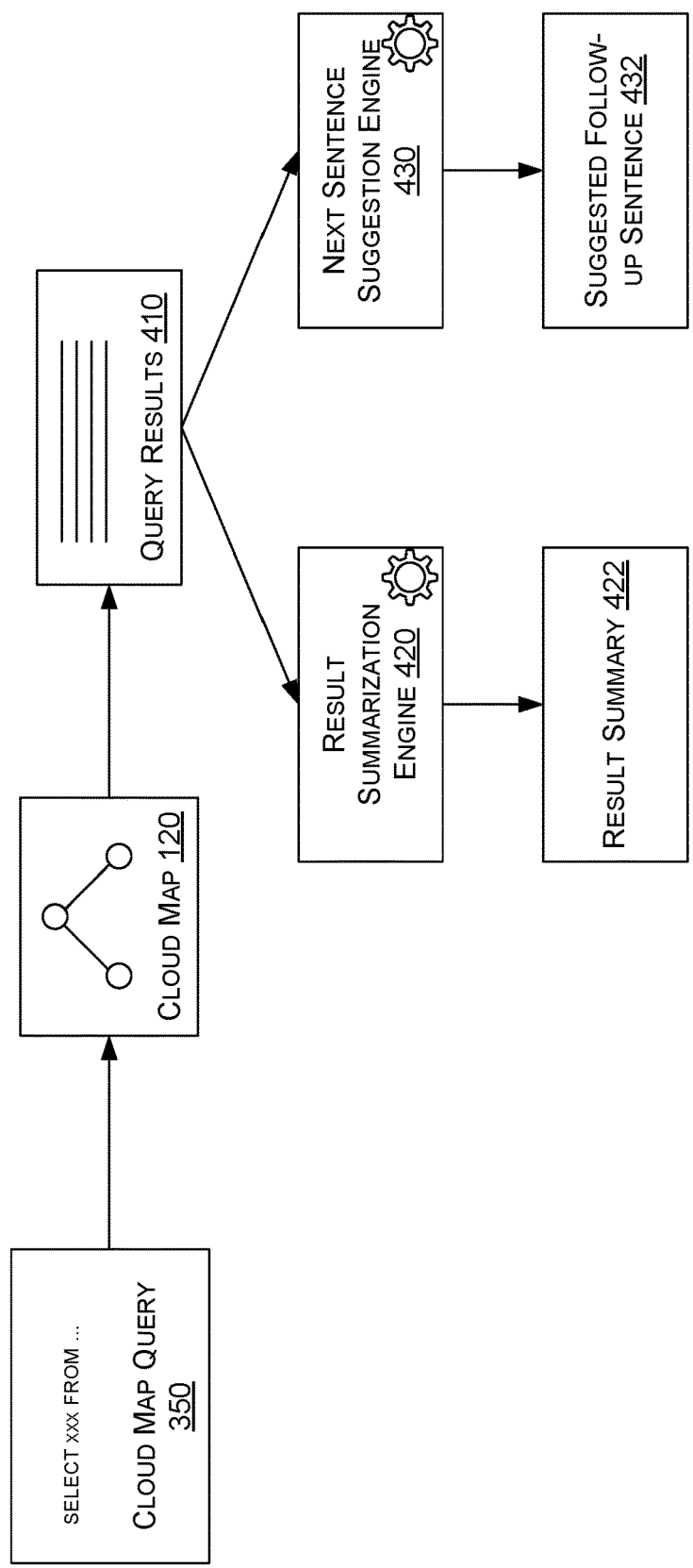
FIG. 4 illustrates using the cloud map query to query the cloud map.

FIG. 4 illustrates using the cloud map query to query the cloud map. Cloud map query 350 is executed against cloud map 120. The resulting query results 410 may be returned as a response to sentence 210. Additionally, or alternatively, query results 410 may be processed by result summarization engine 420 into result summary 422. Result summarization engine 420 may employ a machine learning model to analyze the multitude of query results 410. For example, result summarization engine 420 may identify patterns within query results 410 for anomalies or patterns. Result summarization engine 420 may take into account previous interaction, increasing the likelihood of generating a result summary that is relevant.

Additionally, or alternatively next sentence suggestion engine 430 may generate suggested follow-up sentence 432 based at least in part on query results 410. Other factors, such as a chat history, may also be used to suggest follow-up sentence 432, giving engine 430 greater context and insight into what the administrator may have been doing. For example, if query results 410 lists a number of storage accounts exposed to the internet, suggested follow-up sentence 432 may be "storage accounts that allow public access and contain sensitive information".

Figure 5:
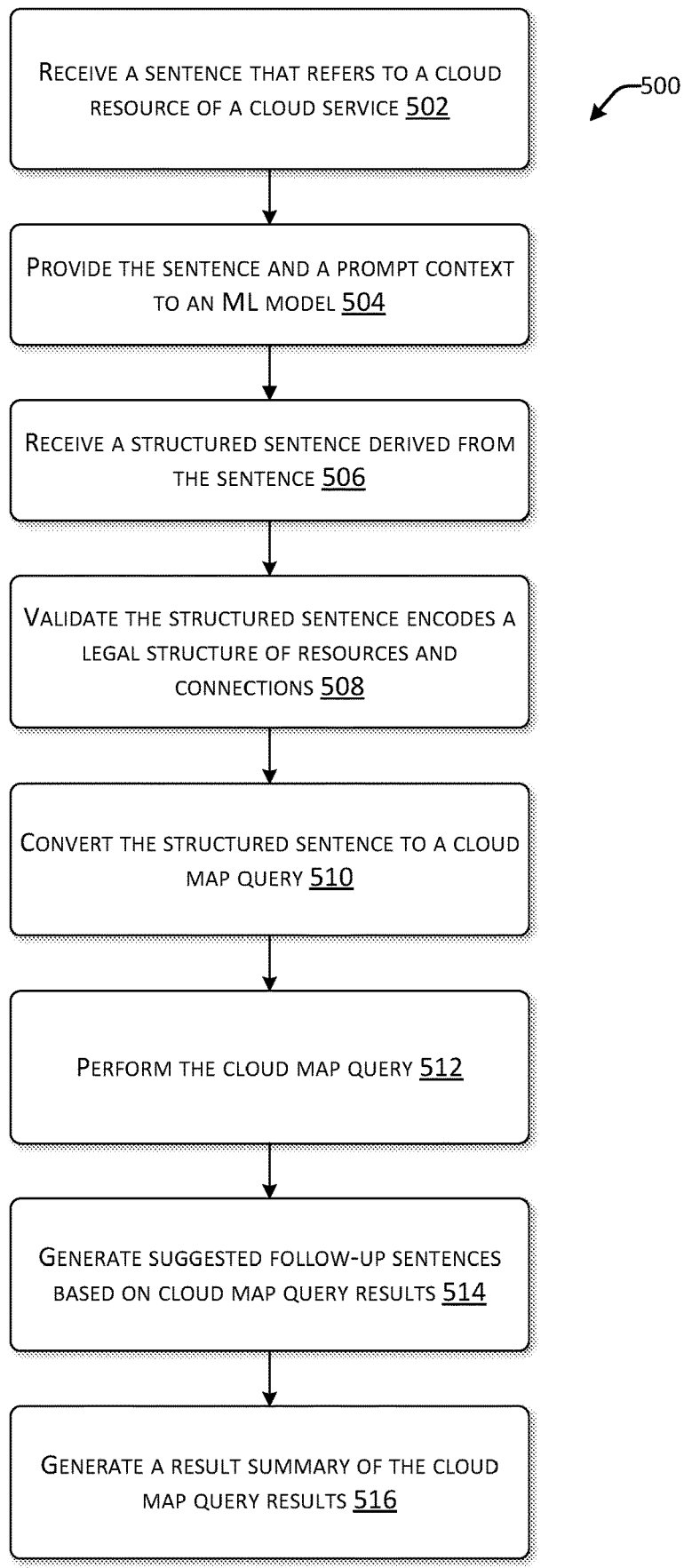
FIG. 5 is a flow diagram of an example method for a natural language API for security graph exploration.

FIG. 5 is a flow diagram of an example method for a natural language API for security graph exploration. Routine 500 begins at operation 502, where sentence 210 is received. Sentence 210 may be a natural language description of a query or a request targeted at cloud map 120.

Routine 500 continues at operation 504, where sentence 210 and prompt context 220 are provided to structured sentence generation model 216 of query generation engine 214.

Routine 500 continues at operation 506, where structured sentence 260 is received from structured sentence generation model 216.

Routine 500 continues at operation 508, where structured sentence 260 is validated against cloud map 120.

Routine 500 continues at operation 510, where the validated structured sentence 260 is converted to cloud map query 350.

Routine 500 continues at operation 512, where cloud map query 350 is submitted to cloud map 120 for execution. Query results 410 are received.

Routine 500 continues at operation 514, where suggested follow-up sentences 432 are generated based on cloud map query results 410.

Routine 500 continues at operation 516, where result summary 422 is generated based on cloud map query results 410.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 500 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routines 500 may be also implemented in many other ways. For example, the routine 500 may be implemented, at least in part, by a processor of another remote computer or a local circuit. In addition, one or more of the operations of the routine 500 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

Figure 6:
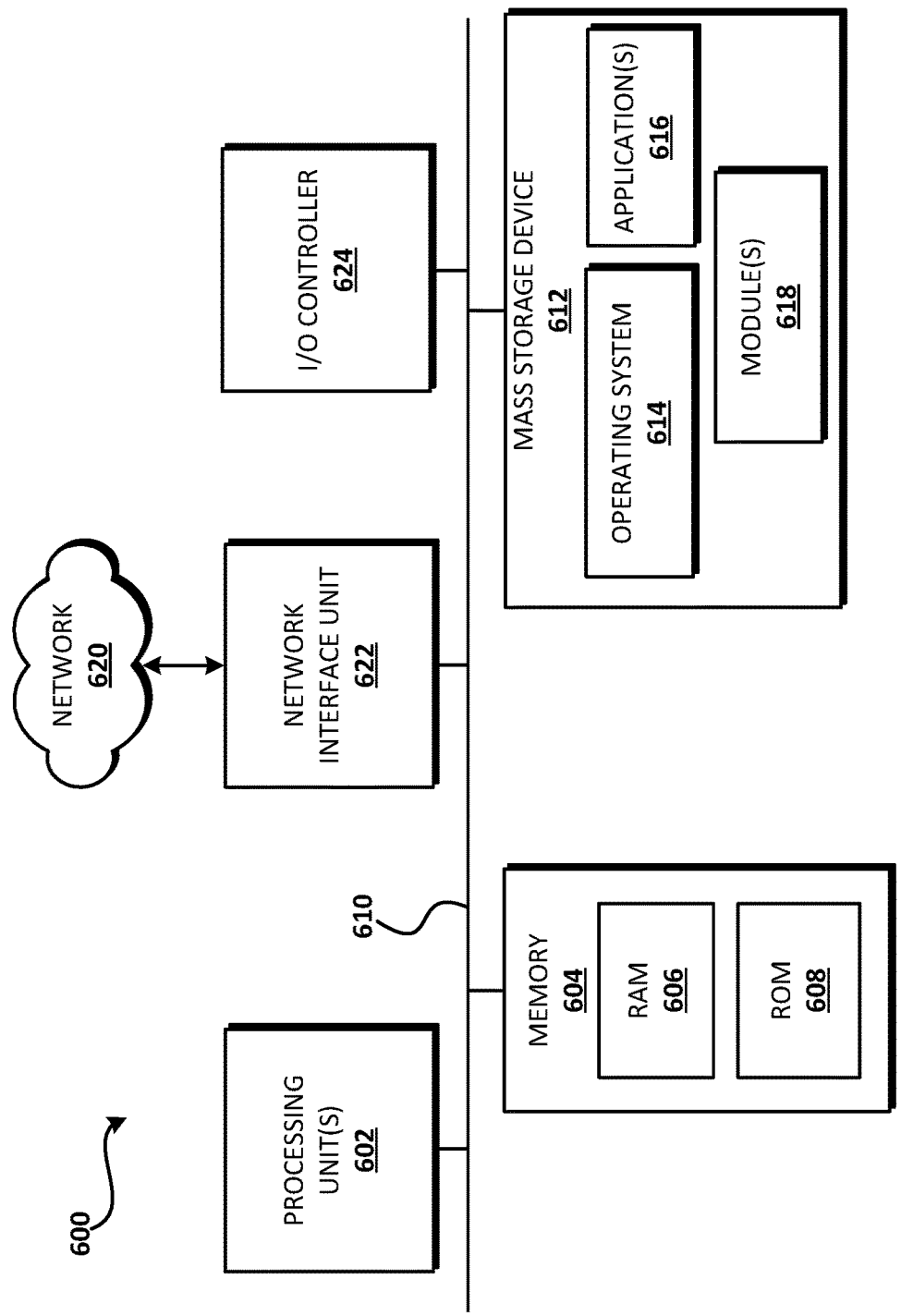
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a device, such as a computer or a server configured as part of the systems described herein, capable of executing computer instructions (e.g., a module or a program component described herein). The computer architecture 600 illustrated in FIG. 6 includes processing unit(s) 602, a system memory 604, including a random-access memory 606 ("RAM") and a read-only memory ("ROM") 608, and a system bus 610 that couples the memory 604 to the processing unit(s) 602.

Processing unit(s), such as processing unit(s) 602, can represent, for example, a CPU-type processing unit, a GPU-type processing unit, a neural processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), Neural Processing Unites (NPUs) etc.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616, modules 618, and other data described herein.

The mass storage device 612 is connected to processing unit(s) 602 through a mass storage controller connected to the bus 610. The mass storage device 612 and its associated computer-readable media provide non-volatile storage for the computer architecture 600. Although the description of computer-readable media contained herein refers to a mass storage device, it should be appreciated by those skilled in the art that computer-readable media can be any available computer-readable storage media or communication media that can be accessed by the computer architecture 600.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 600 may operate in a networked environment using logical connections to remote computers through the network 620. The computer architecture 600 may connect to the network 620 through a network interface unit 622 connected to the bus 610. The computer architecture 600 also may include an input/output controller 624 for receiving and processing input from a number of other devices, including a keyboard, mouse, touch, or electronic stylus or pen. Similarly, the input/output controller 624 may provide output to a display screen, a printer, or other type of output device.

It should be appreciated that the software components described herein may, when loaded into the processing unit(s) 602 and executed, transform the processing unit(s) 602 and the overall computer architecture 600 from a general-purpose computing system into a special-purpose computing system customized to facilitate the functionality presented herein. The processing unit(s) 602 may be constructed from any number of transistors or other discrete circuit elements, which may individually or collectively assume any number of states. More specifically, the processing unit(s) 602 may operate as a finite-state machine, in response to executable instructions contained within the software modules disclosed herein. These computer-executable instructions may transform the processing unit(s) 602 by specifying how the processing unit(s) 602 transition between states, thereby transforming the transistors or other discrete hardware elements constituting the processing unit(s) 602.

The present disclosure is supplemented by the following example clauses:

Example 1: A method comprising: receiving a sentence expressed at least in part with natural language, wherein the sentence refers to a cloud resource of a cloud service; providing the sentence and a prompt context as input to a machine learning model, wherein the prompt context lists cloud resources and cloud resource connections available on the cloud service; receiving, from the machine learning model, a structured sentence derived from the sentence; converting the structured sentence to a query that targets a cloud map, wherein the cloud map models a collection of cloud resources of the cloud service; and performing the query on the cloud map.

Example 2: The method of Example 1, further comprising: validating that the structured sentence comprises a configuration of cloud resources that is compatible with the cloud map.

Example 3: The method of Example 2, wherein validating that the structured sentence comprises a configuration of cloud resources that is compatible with the cloud map comprises: providing a prompt to a machine learning model to confirm that a configuration of cloud resources defined by the structured sentence maps to the configuration of cloud resources modeled by the cloud map.

Example 4: The method of Example 2, wherein validating that the structured sentence comprises a configuration of cloud resources that is compatible with the cloud map comprises: confirming that a configuration of cloud resources defined by the structured sentence maps to legal arrangement of cloud resources in the cloud map.

Example 5: The method of Example 1, further comprising: determining that the structured sentence comprises a configuration of cloud resources that is incompatible with the cloud map; and fixing the incompatibility of the structured sentence.

Example 6: The method of Example 5, further comprising: displaying the fixed structured sentence as a suggested sentence.

Example 7: The method of Example 1, wherein converting the structured sentence to the query comprises adapting a universal structured sentence to cloud resources of a specific client.

Example 8: A system comprising: a processing unit; and a computer-readable storage medium having computer-executable instructions stored thereupon, which, when executed by the processing unit, cause the processing unit to: receive a sentence expressed at least in part with natural language, wherein the sentence refers to a cloud resource of a cloud service; provide the sentence and a prompt context as input to a machine learning model, wherein the prompt context lists cloud resources and cloud resource connections available on the cloud service; receive, from the machine learning model, a structured sentence derived from the sentence; convert the structured sentence to a query that targets a cloud map, wherein the cloud map models a collection of cloud resources of the cloud service; perform the query on the cloud map; and receive a plurality of query results.

Example 9: The system of Example 8, wherein the computer-executable instructions further cause the processing unit to: summarize, with a machine learning model, the query results.

Example 10: The system of Example 9, wherein the query results are summarized in part based on previously processed sentences, structured sentences, queries, or query results.

Example 11: The system of Example 8, wherein the computer-executable instructions further cause the processing unit to: generate a follow-up question based on the query results.

Example 12: The system of Example 8, wherein resources in the cloud service are represented by nodes in the cloud map, and wherein resource connections in the cloud service are represented by edges in the cloud map.

Example 13: The system of Example 8, wherein the prompt context does not indicate legal arrangements of cloud resources and cloud resource connections.

Example 14: The system of Example 8, wherein the prompt context lists filters which may be applied individual cloud resources or to connections between cloud resources.

Example 15: A computer-readable storage medium having encoded thereon computer-readable instructions that when executed by a processing unit causes a system to: receive a security question expressed at least in part with natural language, wherein the security question refers to a cloud resource of a cloud service; provide the security question and a prompt context as input to a machine learning model, wherein the prompt context lists cloud resources and cloud resource connections available on the cloud service; receive, from the machine learning model, a structured security question derived from the security question; convert the structured security question to a query that targets a cloud map, wherein the cloud map models a collection of cloud resources of the cloud service; and perform the query on the cloud map.

Example 16: The computer-readable storage medium of Example 15, wherein the structured security question relates the security question to a cloud resource schema.

Example 17: The computer-readable storage medium of Example 15, wherein the prompt context comprises a schema that lists entities that are allowed as part of the structured security question.

Example 18: The computer-readable storage medium of Example 17, wherein the schema includes lists of conditions, insights, recommendations, and filters that may appear in the structured security question.

Example 19: The computer-readable storage medium of Example 15, wherein the instructions further cause the system to: infer a direction of a connection when converting the structured security question to the query.

Example 20: The computer-readable storage medium of Example 15, wherein the instructions further cause the system to: receive a query response comprising a plurality of resources that satisfy the query; and prioritize the plurality of resources based on a level of severity of security vulnerability.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable.

Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method comprising:
   receiving a sentence expressed at least in part with natural language, wherein the sentence refers to a cloud resource of a cloud service;
   providing the sentence and a prompt context as input to a machine learning model, wherein the prompt context lists cloud resources and cloud resource connections available on the cloud service;
   receiving, from the machine learning model, a structured sentence derived from the sentence, wherein the structured sentence includes a reference to a cloud resource or a cloud resource connection listed in the prompt context;
   converting the structured sentence to a query that targets a cloud map, wherein the cloud map models a collection of cloud resources of the cloud service; and
   performing the query on the cloud map.

2. The method of claim 1, further comprising:
   validating that the structured sentence comprises a configuration of cloud resources that is compatible with the cloud map.

3. The method of claim 2, wherein validating that the structured sentence comprises a configuration of cloud resources that is compatible with the cloud map comprises:
   providing a prompt to a machine learning model to confirm that a configuration of cloud resources defined by the structured sentence maps to the configuration of cloud resources modeled by the cloud map.

4. The method of claim 2, wherein validating that the structured sentence comprises a configuration of cloud resources that is compatible with the cloud map comprises:
   confirming that a configuration of cloud resources defined by the structured sentence maps to legal arrangement of cloud resources in the cloud map.

5. The method of claim 1, further comprising:
   determining that the structured sentence comprises a configuration of cloud resources that is incompatible with the cloud map; and
   fixing the incompatibility of the structured sentence.

6. The method of claim 5, further comprising:
   displaying the fixed structured sentence as a suggested sentence.

7. The method of claim 1, wherein converting the structured sentence to the query comprises adapting a universal structured sentence to cloud resources of a specific client.

8. A system comprising:
   a processing unit; and
   a computer-readable storage medium having computer-executable instructions stored thereupon, which, when executed by the processing unit, cause the processing unit to:
   receive a sentence expressed at least in part with natural language, wherein the sentence refers to a cloud resource of a cloud service;
   provide the sentence and a prompt context as input to a machine learning model, wherein the prompt context lists cloud resources and cloud resource connections available on the cloud service;
   receive, from the machine learning model, a structured sentence derived from the sentence, wherein the structured sentence includes a reference to a cloud resource or a cloud resource connection listed in the prompt context;
   convert the structured sentence to a query that targets a cloud map, wherein the cloud map models a collection of cloud resources of the cloud service;
   perform the query on the cloud map; and
   receive a plurality of query results.

9. The system of claim 8, wherein the computer-executable instructions further cause the processing unit to:
   summarize, with a machine learning model, the query results.

10. The system of claim 9, wherein the query results are summarized in part based on previously processed sentences, structured sentences, queries, or query results.

11. The system of claim 8, wherein the computer-executable instructions further cause the processing unit to:
    generate a follow-up question based on the query results.

12. The system of claim 8, wherein resources in the cloud service are represented by nodes in the cloud map, and wherein resource connections in the cloud service are represented by edges in the cloud map.

13. The system of claim 8, wherein the prompt context does not indicate legal arrangements of cloud resources and cloud resource connections.

14. The system of claim 8, wherein the prompt context lists filters which may be applied individual cloud resources or to connections between cloud resources.

15. A computer-readable storage medium having encoded thereon computer-readable instructions that when executed by a processing unit causes a system to:
    receive a security question expressed at least in part with natural language, wherein the security question refers to a cloud resource of a cloud service;
    provide the security question and a prompt context as input to a machine learning model, wherein the prompt context lists cloud resources and cloud resource connections available on the cloud service;
    receive, from the machine learning model, a structured security question derived from the security question, wherein the structured security question includes a reference to a cloud resource or a cloud resource connection listed in the prompt context;
    convert the structured security question to a query that targets a cloud map, wherein the cloud map models a collection of cloud resources of the cloud service; and
    perform the query on the cloud map.

16. The computer-readable storage medium of claim 15, wherein the structured security question relates the security question to a cloud resource schema.

17. The computer-readable storage medium of claim 15, wherein the prompt context comprises a schema that lists entities that are allowed as part of the structured security question.

18. The computer-readable storage medium of claim 17, wherein the schema includes lists of conditions, insights, recommendations, and filters that may appear in the structured security question.

19. The computer-readable storage medium of claim 15, wherein the instructions further cause the system to:
   infer a direction of a connection when converting the structured security question to the query.

20. The computer-readable storage medium of claim 15, wherein the instructions further cause the system to:
   receive a query response comprising a plurality of resources that satisfy the query; and
   prioritize the plurality of resources based on a level of severity of security vulnerability.

\* \* \* \* \*